Nov. 4, 1969   J. A. BUSH ET AL   3,475,790
MOLD DIE CONSTRUCTION FOR SEAL RINGS
Filed Nov. 24, 1967   2 Sheets-Sheet 1
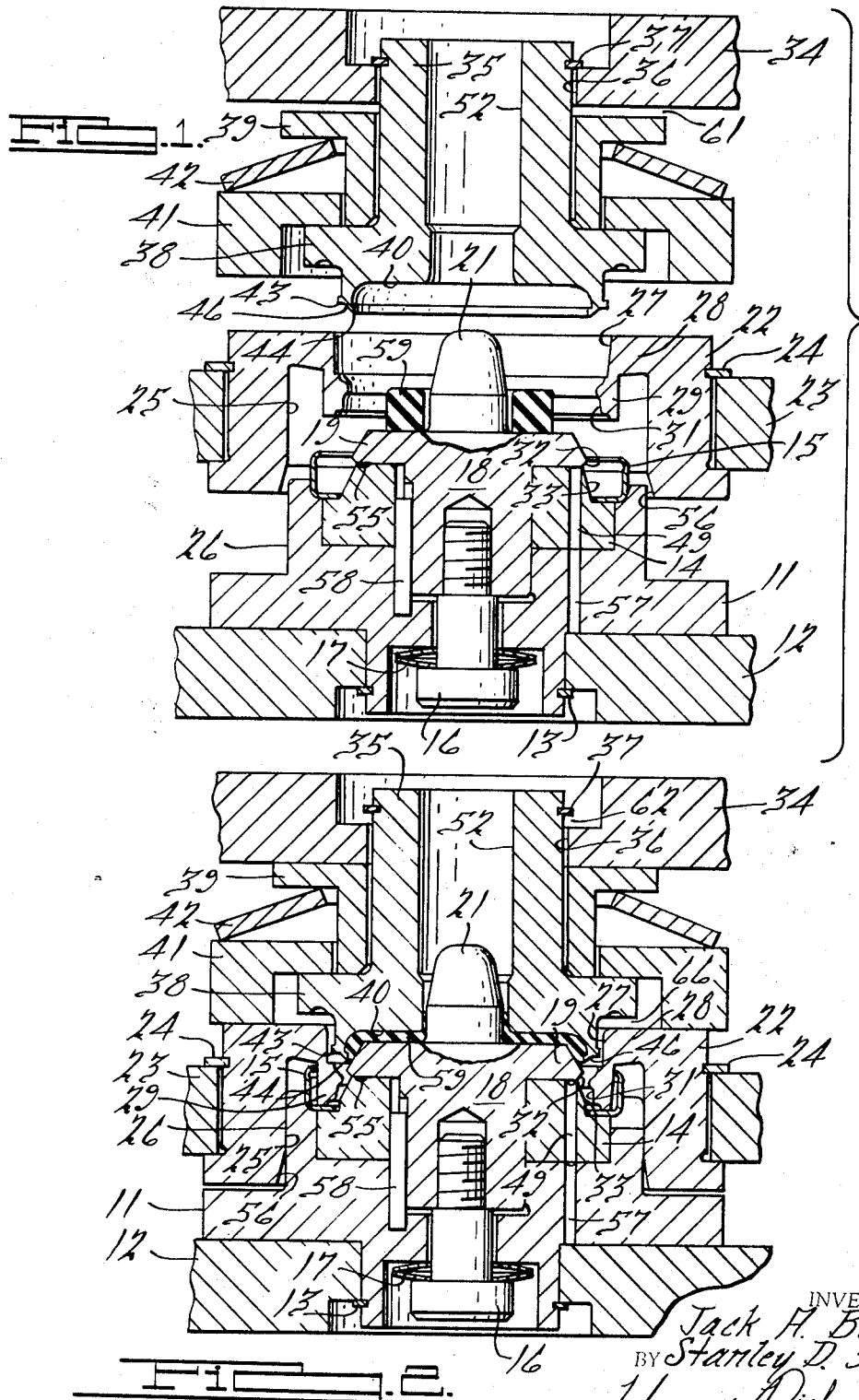
INVENTORS.
Jack A. Bush,
BY Stanley D. Shault
Harness, Dickey & Pierce
ATTORNEYS

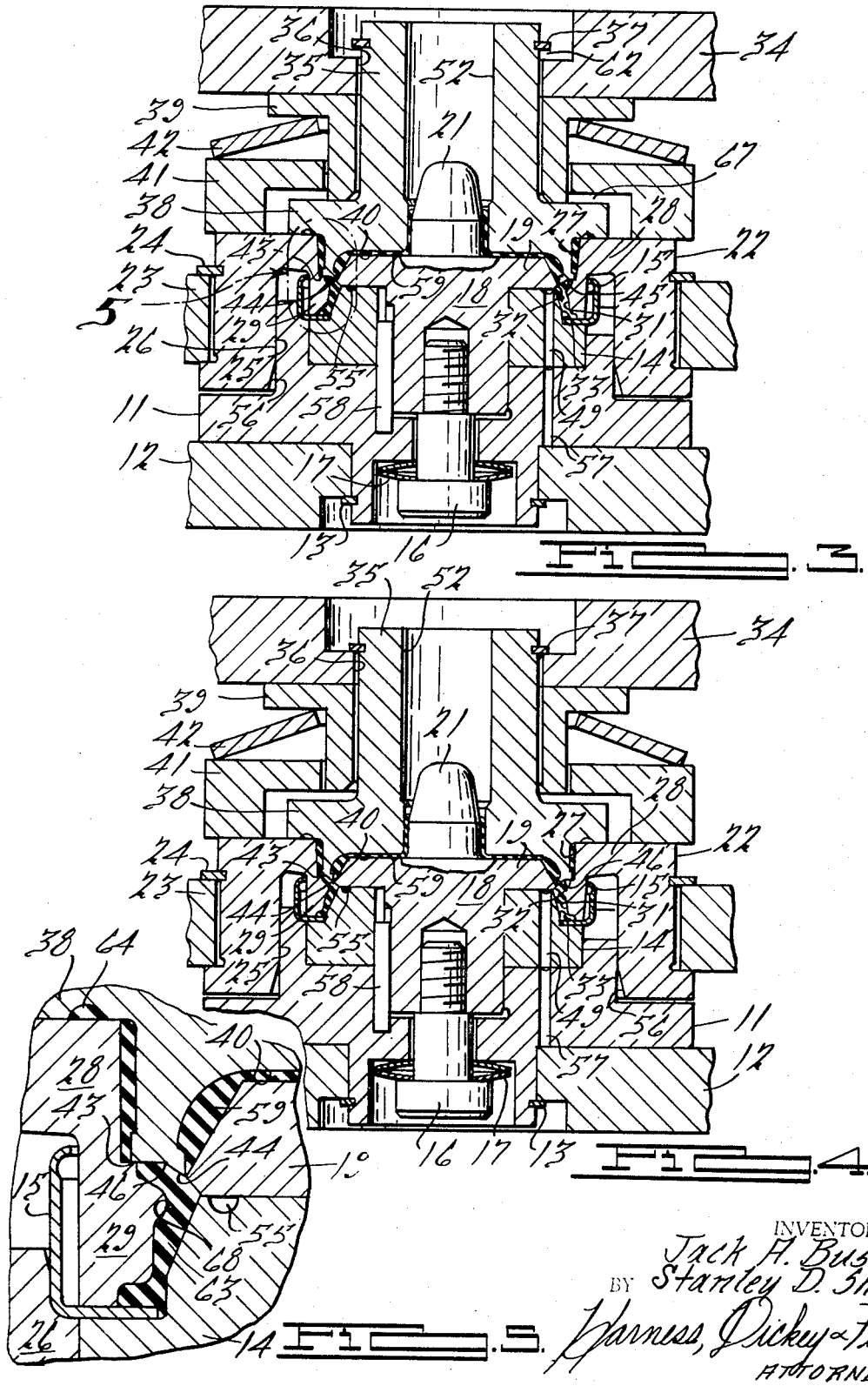

United States Patent Office 3,475,790
Patented Nov. 4, 1969

3,475,790
MOLD DIE CONSTRUCTION FOR SEAL RINGS
Jack A. Bush, Birmingham, and Stanley D. Shaull, Orchard Lake, Mich., assignors, by mesne assignments, to Microdot Inc., New York, N.Y., a corporation of California
Filed Nov. 24, 1967, Ser. No. 685,440
Int. Cl. B29d 3/00
U.S. Cl. 18—36    9 Claims

ABSTRACT OF THE DISCLOSURE

The disclosure pertains to apparatus for molding the elastomeric sealing portion of a fluid seal while bonding it to a metal case.

BACKGROUND OF THE INVENTION

A die structure for molding the elastomeric portion of the seal and bonding it to a metal case in accordance with the present invention is an improvement on the die structure disclosed in the patent to Baney et al., No. 3,315,316.

SUMMARY OF THE INVENTION

The die construction of the instant invention comprises an upper plate that is movable downwardly and upwardly and as by a conventional press, not shown. Movement of the upper plate is transmitted through a relatively movable bushing, to both an upper die insert and to a hold-down plate. The hold-down plate is engageable with a center insert which, in turn, is movable downwardly into juxtaposition with a lower insert. The lower insert is secured to a base plate and guides the center insert as well as supports a central hold-down core. The hold-down core is retained in a manner that permits bleed of air and gases. A seal case is secured between the center insert and the lower insert. An annular ring of elastomeric material is positioned on the hold-down core so as to be compressed by the upper insert and flow into the cavity defined by said inserts. Initial upward movement of the upper plate permits separation of the upper insert from the hold-down core under the bias of influence of the compressed elastomeric material while the center insert on the case is retained. Further movement of the upper plate effects positive upward movement of the upper insert which strips the excess material from the molded seal.

BRIEF DESCRIPTION OF THE DRAWINGS

FIGURE 1 is a fragmentary cross sectional view through a die with parts in open position and loaded ready for a cycle of operation;

FIG. 2 is a view of the structure illustrated in FIG. 1, showing the die in the first stage of closing;

FIG. 3 is a view of the structure illustrated in FIG. 1, showing the die in fully closed position;

FIG. 4 is a view of the structure illustrated in FIG. 3, showing the die in the first stage of opening, and FIG. 5 is an enlarged, broken sectional view of the structure illustrated in FIG. 3, as viewed within the circle 5 thereof.

DESCRIPTION OF THE PREFERRED EMBODIMENT

Fluid seals are often fabricated in multicavity molding dies in which an elastomeric material is concomitantly molded to a predetermined shape and bonded to a metal case. Such a diet set, in accordance with the instant invention, comprises a lower insert 11 secured to a base plate 12 by a split spring ring 13. The lower insert 11 has a changeable portion 14 which, together with the remaining portion of the insert 11, forms a seat for a flanged cylindrical case 15 to which the elastomeric seal is to be bonded.

A bolt 16 having a pair of reversely orientated spring washers 17 thereon extends through a central aperture in the lower insert 11 and is threaded into a hold-down core 18. The hold-down core 18 has a radially outwardly extending flange 19 and a central upwardly projecting pin 21. The spring washers 17 effect a controlled bias on the core 18 to "bleed" gases as will be described.

An annular center insert 22 is secured to a movable center plate 23 as by a split ring 24. The center insert 22 has an axial wall 25 which, in conjunction with an outer wall 26 of the lower insert 11, effects concentric alignment of the center and lower inserts. The center insert 22 has a flange 28 with an axial extension 29 thereon that engages the case 15 when the die set is closed, as will be described. The axial extension 29 has a preformed face 31 which in conjunction with a face 32 of the flange 19 on the core 18 and a face 33 of the die portion 14, define the die cavity.

The upper plate 34 has an upper insert 35 slidably retained in an aperture 36 therein by a split ring 37. The upper insert 35 has a flange 38 on which a flanged bushing 39 and a hold-down plate 41 are supported. A conical spring 42 extends between a flange on the bushing 39 and the hold-down plate 41. A recess 40 is provided in the central bottom portion of the upper insert 35 to receive the the flange 19 of the hold-down core 18. The lower extremity of the upper insert 35 has an annular land 43 of rectangular cross section and an annular land 44 of a sharply pointed conical section. As best seen in FIG. 5, both of the lands 43 and 44 effect a reduction in the cross section of the elastomeric material adjacent the center insert 22 and hold-down core 18, respectively, whereby the square upper surfaces on said lands effect tear trimming of the elastomeric material upon opening of the die. The function of the lands 43 and 44 thus is to reduce the elastomeric cross section during molding and to effect tear trimming thereof upon relative movement of the upper die insert 35 relative to the center die section. A surface 46 between the lands 43 and 44 forms a portion of the seal cavity.

The lower die portion 14 has an annular scavenging groove 45 therein which communicates with one or more vertical bores 57 in the lower insert 11. The apertures 57 are aligned by a dowel 58.

In accordance with one feature of the instant invention, the hold-down core 18 can move upwardly against the bias of the spring washers 17 to permit trapped air and gases to flow between the flange 19 on the core 18 and the lower die insert 14 into the annulus 55, thence escape through bores 57.

Referring to the structure of FIGURE 1, the die set is illustrated in open position with the upper insert 35 spaced above the center insert 22 which is spaced above the lower insert 11. The upper insert 35 is raised to this position by the platen of a press to which the top plate 34 is secured. The center insert 22 is raised to the position illustrated in FIGURE 1 by, for example, cams, to permit the case 15 to be inserted and a ring of elastomeric material 59 to be placed over the pin 21 on top of the flange 19. The top plate 34 is moved downwardly, whereupon the hold-down plate 41 engages the top of the center insert 22 causing it to move downwardly therewith. Movement of the center insert 22 is guided by the lower insert 11. As illustrated in FIG. 2, this much of the movement brings the depending portion 29 of the center insert 22 into engagement with the case 15 to positively position it against the insert portion 14, as well as to initially compress the elastomeric material 59 to cause it to flow outwardly over the top of the flange 19 of the core 18 and into the die cavity. Any air or gases trapped in the die cavity are bled into the annulus 55 and out the passages 57 which is made possible by the controlled pressure of the hold-down core 18 on the insert portion 14 effected by the springs 17.

It will be noted that the aforesaid downward movement of the plate 34 closes a gap 61 and forms a gap 62 between the plate 34 and the securing ring 37 thereby to initially load the spring 42.

As the plate 34 continues to move downwardly, the portion 29 engages the case 15. Further movement of the upper plate 34 additionally loads the spring 42 and moves the upper insert 35 to the position shown in FIG. 3. Heating of the elastomeric material at this stage cures it whereupon the die set is opened by raising the top plate 34.

It is to be noted that upon initial opening movement of the plate 34, the center insert 22 is held down by the spring 42, whereas the upper insert 35 is free to "float" upwardly under the bias of the compressed elastomeric material. This feature permits initial opening movement without disturbing the freshly cured elastomer. Subsequent additional upward movement of the upper plate 34 results in upward movement of the upper insert 38 and tear trimming of excess elastomeric material by the upper square shoulders on the lands 43 and 44.

The lip portion 63 of the seal formed in the aforesaid manner has an annular arcuate recess 68 for receiving a garter spring which urges the elastomeric seal against a shaft, not shown.

What is claimed is:

1. A die set for molding an elastomeric seal and bonding it to a case, comprising a top supporting plate, an annular upper insert supported by said plate for longitudinal movement relative thereto, said upper insert having a bottom flange and an annular extension having a portion of a die face thereon, a bottom plate, a lower insert on said bottom plate having a reecss for supporting a case and having a die face portion, a hold-down core at the center of said lower insert spring loaded for longitudinal movement relative thereto and having a flange resting on said lower insert with a face portion thereon, a center insert having an aperture which extends over the lower insert so as to be guided thereby on downward movement relative thereto, said center insert having a clamping portion for the case and a die face, the die faces on the upper insert, the center insert, the lower insert and the hold-down core forming a predetermined cross sectional cavity.

2. A die set as recited in claim 1, wherein the clamping portion of the center insert forms an inverted U-shaped section therewith.

3. A die set as recited in claim 2, wherein the case is supported on the lower insert by the clamping portion of the center insert and said case has an annular edge extending into the die cavity to which the elastomeric seal is bonded.

4. A die set as recited in claim 3, wherein a bushing is provided about the upper insert, a hold-down plate about the upper insert, and spring means between the bushing and hold-down plate for applying a pressure to the center insert for holding the case in position while permitting the upper insert to freely move upwardly upon upward movement of the top plate.

5. A die set as recited in claim 1, wherein the upper insert has a tear trimming land thereon.

6. A die set for molding an elastomeric seal and bonding it to a case comprising a top supporting plate, an annular upper insert supported by said plate for longitudinal movement relative thereto, said insert having a bushing and a hold-down plate thereabout, a spring between said bushing and said hold-down plate, a bottom plate having a lower insert thereon, a center insert between said upper and lower inserts, said lower insert having a recess for a case, said center insert having a clamping portion for engaging and retaining said case in said recess when engaged by said hold-down plate, and spring means permitting the further movement of the upper insert to close the die cavity.

7. A die set as recited in claim 6, wherein the die cavity is formed by face portions on said inserts.

8. A die set as recited in claim 7, wherein a hold-down core is provided on the lower insert which is spring pressed into controlled axial pressure thereagainst to permit the escape of air and gases from the die cavity.

9. A die set as recited in claim 8, wherein the center insert has a radially inner wall that is guided on a radially outer wall of the lower insert.

References Cited

UNITED STATES PATENTS

| | | |
|---|---|---|
| 2,950,506 | 8/1960 | Corsi. |
| 2,982,997 | 5/1961 | Peickii et al. |
| 2,982,999 | 5/1961 | Stewart. |
| 2,990,206 | 6/1961 | Bagdon. |
| 3,004,298 | 10/1961 | Haynie. |
| 3,241,193 | 3/1966 | Pohlman. |
| 3,315,316 | 4/1967 | Baney et al. |
| 3,341,647 | 9/1967 | Aberle. |

J. HOWARD FLINT, Jr., Prmary Examiner